(12) United States Patent
Bao

(10) Patent No.: US 6,708,257 B2
(45) Date of Patent: *Mar. 16, 2004

(54) BUFFERING SYSTEM BUS FOR EXTERNAL-MEMORY ACCESS

(75) Inventor: Liewei Bao, Hoffman Estates, IL (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 151 days.

(21) Appl. No.: 09/351,053

(22) Filed: Jul. 12, 1999

(65) Prior Publication Data

US 2001/0052060 A1 Dec. 13, 2001

(51) Int. Cl.[7] ............................ G06F 12/00; G06F 13/00
(52) U.S. Cl. ....................... 711/154; 711/102; 711/104; 711/138; 710/38; 710/39; 710/57; 710/112
(58) Field of Search ................................. 711/119, 154, 711/102–105, 138, 159, 165; 710/112, 36, 38–39, 52, 57, 107, 310, 313

(56) References Cited

U.S. PATENT DOCUMENTS

| | | | |
|---|---|---|---|
| 5,887,195 A | | 3/1999 | Sudo |
| 5,974,501 A | * | 10/1999 | Shaver et al. ............... 711/105 |
| 6,021,473 A | * | 2/2000 | Davis et al. ................ 711/118 |
| 6,044,225 A | * | 3/2000 | Spencer et al. ............... 710/52 |
| 6,138,183 A | * | 10/2000 | Tien et al. .................... 703/23 |
| 6,145,042 A | * | 11/2000 | Walton ....................... 710/112 |
| 6,243,769 B1 | * | 6/2001 | Rooney ....................... 710/22 |
| 6,351,787 B2 | * | 2/2002 | Katayama et al. .......... 711/103 |
| 6,356,963 B1 | * | 3/2002 | Maguire et al. ............ 709/220 |

* cited by examiner

Primary Examiner—Reginald G. Bragdon
Assistant Examiner—Pierre M. Vital
(74) Attorney, Agent, or Firm—Michael J. Ure

(57) ABSTRACT

A computer system includes a processor, a cache, a system bus, a memory-control subsystem, an external memory bus, RAM memory, and flash memory. All but the last three are fabricated on a single ASIC. The memory control subsystem includes a RAM controller, a flash-memory controller, and a memory interface between the controllers and the memories. In addition, the memory-control subsystem includes a system-bus FIFO write buffer. During an external-memory access, the request information is transferred from the system bus to the system-bus buffer instead of directly to the memory interface. The system-bus buffer stores address data, content data (in the case of a write request), and control data. In turn, the control data is forwarded to the appropriate controller and the address data and the content data are forwarded to external memory bus. Note that only one system-bus write buffer is required despite the plural memory controllers. While the processor write buffer frees the processor for other tasks while a write operation is being completed, the system-bus write buffer frees the system bus for other tasks while a write operation is being completed. The system-bus buffer thus allows other operations to utilize the system bus during an external-memory access.

11 Claims, 3 Drawing Sheets

Fig. 3

| BUS CYCLES OCCUPIED BY WRITE REQUESTS | | | | | | | | | | | | | | | |
|---|---|---|---|---|---|---|---|---|---|---|---|---|---|---|---|
| 1 | | 2 | 3 | | | | 4 | | | | 5 | | | | |
| M1 | | | M2 | | | M3 | | | M4 | | | M5 | | | |

EXTERNAL-MEMORY CYCLES OCCUPIED BY WRITE REQUESTS

BUFFERING SYSTEM BUS FOR EXTERNAL-MEMORY ACCESS

BACKGROUND OF THE INVENTION

The present invention relates to computer systems and, more particularly, to a computer system with a processor that accesses memory via a system bus. A major objective of the invention is to reduce the time a write to an external memory excludes the use of a system bus for other operations.

Much of modern progress is associated with the proliferation of computers. While much attention is focussed on general-purpose computers, application-specific computers are even more prevalent. Such application-specific computers can be found in new device categories, such as video games, and in advanced versions of old device categories, such as televisions.

A typical computer includes a processor and main memory. The processor executes program instructions, many of which involve the processing of data. Instructions are read from main memory, and data is read from and written to main memory. Advancing technology has provided faster processors and faster memories. As fast as memories have become, they remain a computational bottleneck; processors often have to idle while requests are filled from main memory.

One approach to reducing this bottleneck is to use multiple memories. For example, a small-fast memory can be used with a larger slow main memory. This approach provides for a performance improvement to the extent operations can involve the smaller faster memory.

Caches are a specific class of small fast memories designed to reduce the bottlenecks imposed by accesses to main memory. Caches intercept requests to main memory and attempt to fulfill those requests using memory dedicated to the cache. To be effective, caches must be able to respond much faster than main memory; to achieve the required speed, caches tend to have far less capacity than main memory has. Due to their smaller capacity, caches can normally hold only a fraction of the data and instructions stored in main memory. An effective cache must employ a strategy that provides that the probability of a request for main-memory locations stored in the cache is much greater than the probability of a request for main-memory locations not stored in the cache.

Caches reduce the frequency of main-memory accesses for read operations, but not for write operations. If an address asserted in a read operation is represented in the cache, the copy of the data in the cache is transmitted to the processor in lieu of the data in main memory. Whether or not an address asserted in a write operation is represented in a cache, data must be written (sooner or later) to main memory. (The exceptions to these generalizations do not alter the essential distinctions between the read and write operations.) When a write operation involves writing to a cache, the cache effectively serves as a buffer in the transfer to main memory.

It is not necessary to limit the advantages obtained by buffering write operations to those write operations that assert addresses represented in a cache. Many systems now include write buffers that buffer every write operation. These write buffers can be integrated with a read/write cache or operate independently of a read cache. Every write operation can involve a write to the buffer. The buffer can then manage the transfer to main memory while the processor is freed to execute subsequent operations.

While the write buffer frees the processor from having to wait for data to be written to main memory, it does not significantly reduce the time that the system bus is occupied with write operations. The system bus can thus remain a bottleneck. Processing can be delayed while write operations are issued if the write buffer is full and cannot be freed because the system bus is occupied. Also, read operations involving addresses not represented in the read cache can be delayed. In addition, other types of transfers, e.g., with other processors or devices, involving the system bus, can be delayed while the system bus is occupied with these write operations. What is needed is a system that reduces the load imposed on the system bus by write operations.

SUMMARY OF THE INVENTION

The present invention provides a computer system with a system-bus buffer for buffering memory-access requests. The memory requests include write requests, but can also include read requests. Preferably, the system-bus buffer is a first-in-first-out (FIFO) device. Also preferably, the system-bus buffer stores, in addition to address and content data, control data such as transfer width and transfer type (e.g., sequential versus non-sequential).

A method of the invention provides for a processor issuing a write operation, a system bus transferring the write information, a system-bus buffer storing the write information, a memory bus transferring the write information, and memory storing the write data as requested. Preferably, the method includes the steps of a processor bus transferring the write information, and a processor write buffer storing the write information. These steps occurring in the written order after the processor issues the write operation and before the system bus transfers the write information.

For systems with plural memory controllers, the invention provides a shared system-bus buffer that also stores device-select information. In this vein, a system can have one controller for conventional RAM-based main memory and another controller for flash memory. The flash memory, or other programmable non-volatile memory, can be used to store and upgrade an operating system and/or application-specific programs.

The present invention provides for occupying the system bus only while a write operation is stored in the system-bus buffer, rather than until completion of a write operation. Thus, the system bus can be available for other operations while data is being written to memory. For example, a local fast memory can be accessed during a write to a slower external memory. (Of course, there will be exceptions, e.g., when the buffer is full and when operations contend for other common resources.)

The invention provides alternatives for handling read requests that are not fulfilled from cache. One approach is to buffer all missed read requests just as the write requests are. A second approach is to have read requests bypass the system-bus buffer; there is less to be gained by buffering a read request and bypassing the buffer can sometimes avoid a latency associated with the buffer. A third approach is to bypass the buffer when it is empty, but not otherwise. In this hybrid approach, the system bus is freed for other uses during a read operation unless a latency can be avoided by not buffering the read operation.

Placing two buffers (a processor write buffer and a system-bus buffer) in series along the write path from a processor to main memory would be expected to achieve some performance advantage associated with a greater total buffer capacity. However, such a gain can usually be obtained more efficiently by simply using a larger buffer. Surprisingly, the present invention provides, in many contexts, for performance gains that far exceed that achievable simply by expanding the capacity of the processor write buffer. The favored contexts include systems with multiple processors, systems with multiple memory controllers, and, more generally, systems with system buses involved in many different types of data transfers. These and other features and advantages of the invention are apparent from the description below with reference to the following drawings.

BRIEF DESCRIPTION OF THE DRAWINGS

FIG. 3 is a timing diagram indicated system-bus utilization during a series of write requests in accordance with the present invention.

In the figures, referents beginning with "W" refer to "wait" signal lines, and referents that include both numerals and letters refer to control paths (of one or more control lines). Unlabeled lines are extensions of numerically labeled buses.

DESCRIPTION OF THE PREFERRED EMBODIMENTS

Figure 1:
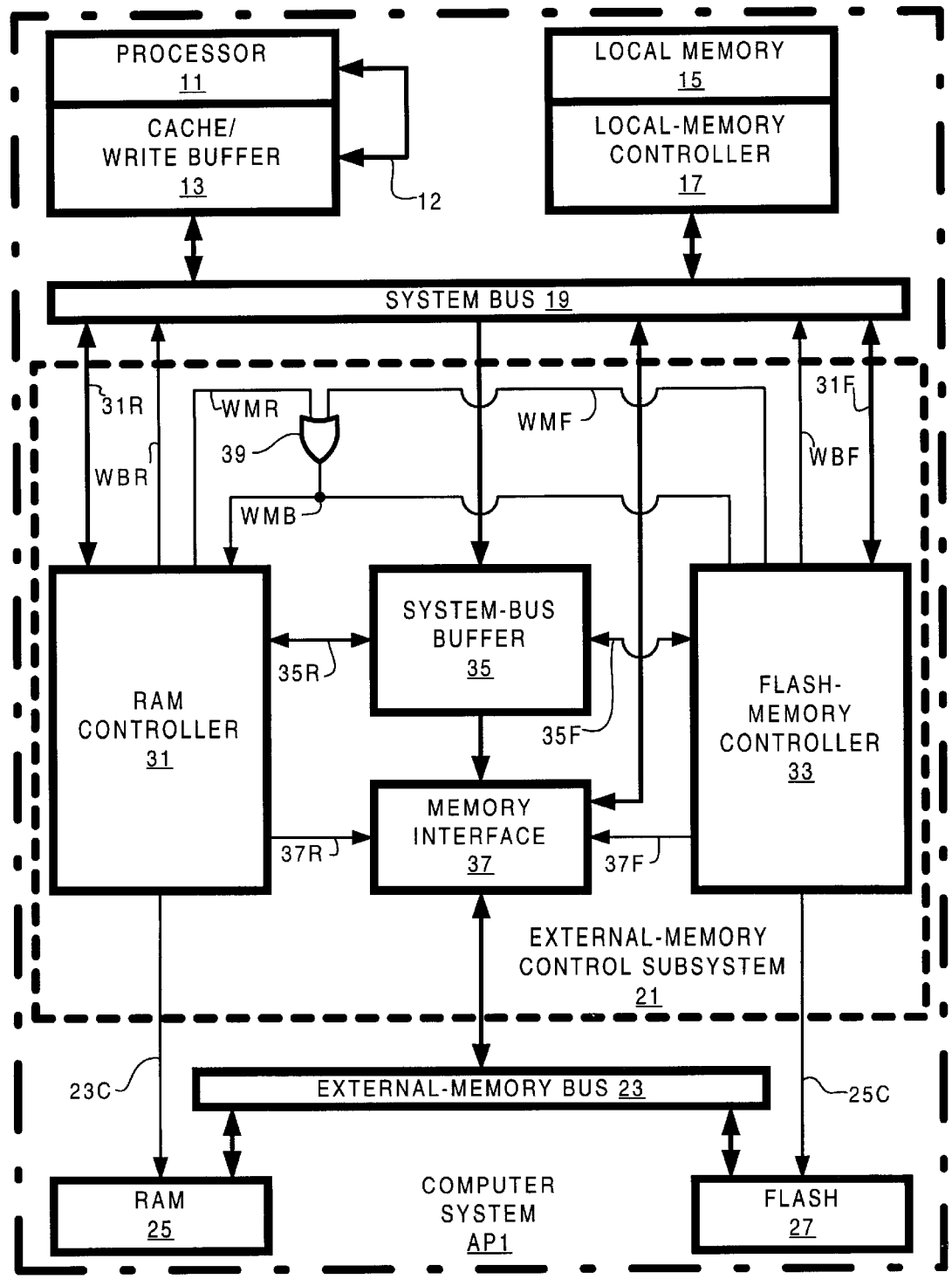
FIG. 1 is a block diagram of a computer system incorporating a system-bus buffer in accordance with the present invention.

A computer system AP1 comprises a processor 11, a processor bus 12, a cache 13, local memory 15, a local memory controller 17, a system bus 19, an external-memory control subsystem 21, an external memory bus 23, random-access memory (RAM) 25, and flash memory 27, as shown in FIG. 1. All but the last three elements listed above are fabricated on a single application-specific integrated circuit (ASIC). Memories 25 and 27 are on separate integrated circuits, and, thus, are "external" memories.

External-memory bus 23 includes traces on a printed-circuit board holding the ASIC and the memories. External-memory bus 23 is shared by external memories 25 and 27 to save pin count on the main ASIC. Local memory 15 is internal (i.e., on the ASIC) random-access memory available for fast computations.

External-memory control subsystem 21 comprises a RAM controller 31, a flash-memory controller 33, a system-bus buffer 35, a memory interface 37, and an OR gate 39. RAM controller 31 controls access to external RAM 25, and flash-memory controller 33 controls access to flash memory 27. Memory interface 37 couples to external-memory bus 23 to define a content and address data path between external-memory control subsystem 21 and external memories 25 and 27.

System-bus buffer 35 buffers write and read requests originated by processor 11 and directed to external memories 25 and 27. The purpose of system-bus buffer 35 is to free system bus 19 to perform other operations while a memory access is being completed. System-bus buffer 35 stores the memory address, the content data to be written (for write requests only), and control data associated with the request. The control data includes device-select data, transfer-size data, transfer-type data (sequential versus non-sequential). System-bus buffer 35 is a first-in-first-out (FIFO) buffer and is two requests deep. When system-bus buffer 35 is full or empty, it so indicates to controllers 31 and 33 via respective control paths 35R and 35F. Memory-interface 37 is directly coupled to system bus 19 so that read data can bypass buffer 35.

Cache 13 includes a write buffer. Its purpose is to free processor bus 12 for other actions while a write request is being fulfilled. Despite being in series along the path from processor 11 to external memories 25 and 27, the write buffer of cache 13 and system-bus buffer 35 are neither redundant or merely cumulative. The presence of a system-bus buffer allows operations to be performed during a write operation that could not be performed during a write operation if only the write buffer of cache 13 were present. For example, a read of local memory 15 can be completed during a write to external RAM 25.

Since external memory bus 23 is shared, each external-memory controller 31, 33 must be able to exclude the other from the memory bus when accessing respective external memory 25, 27. To this end, each controller 31, 33 asserts a respective memory wait signal WMR, WMF, when it needs to exclude access by the other controller. The signal need not be asserted for the entire memory access; it can be terminated a clock cycle early to minimize latencies between external memory accesses. The two signals WMR and WMF are logically added by OR gate 39. The resultant signal WMB is provided to both external controllers 31 and 33. Thus, a controller 31, 33 will wait for WMB to go low before initiating the next request stored in buffer 35.

None of the memory wait signals WMR, WMF, and WMB affect system bus 19 directly. Accordingly, system bus 19 can be used for many types of transfers while an external memory 25, 27 is being accessed. However, if an external-memory access is requested by cache 13 while system-bus buffer 35 is full, the selected controller 31, 33 can wait system bus 19 via a respective wait line WBR, WBF. The status of system-bus buffer 35 is indicated to controllers 31, 33 via respective control paths 35R and 35F. In embodiments in which only writes are buffered by the system-bus buffer, an external-memory controller can wait the system bus when a read is asserted on the system bus while an external memory is being accessed as indicated by memory wait signal WMB.

Figure 2:
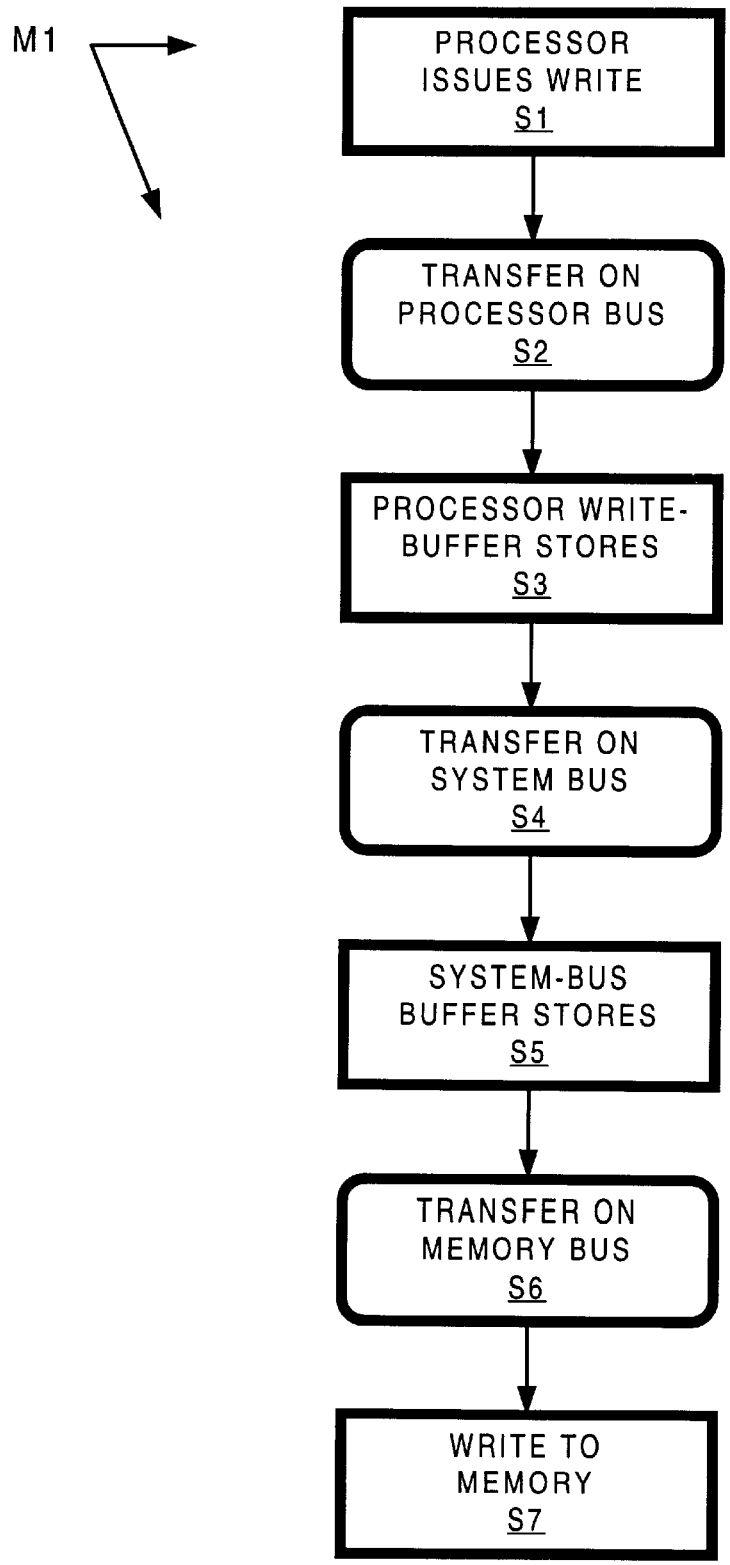
FIG. 2 is a flow chart of a method of the invention practiced in the context of the computer system of FIG. 1.

A method M1 of performing an isolated write to RAM 25 is flow-charted in FIG. 2. Processor 11 issues a write request specifying an address associated with a memory location within RAM 25 at step S1. The write request is transferred on processor bus 12 at step S2. The write buffer of cache 13 stores the write request.

In write-through mode, at step S4, cache 13 transfers the write request to system bus 19. In the case that there are prior write requests in the write buffer, these are handled first. (If cache 13 is in write-back mode, the write request is transferred to system by 19 only when the address asserted in the request is not represented in cache 13.) With the write request on system by 19, the address data, content data, and the control data are made available to system-bus buffer 35. In addition, the control data are made available to RAM controller 31 via path 31R and flash-memory controller 33 via path 31F.

The selected external-memory controller, in this case RAM controller 31, enables the input of system-bus buffer 35 via control path 35R. This stores the address, content, and control data in buffer 35. In the case that there are prior requests in buffer 35, these must be executed first. Once the write request becomes "first", its control data are provided to memory controllers 31 and 35.

RAM controller 31 enables the input of memory interface 37 via control path 37R. This places the address and content data on external bus 23 at step S6. Concurrently, control data is transferred to RAM 25 via control path 23C. The content data is then stored at the location of RAM 25 indicated by the requested address. The width of the content data stored is determined by the control data. This completes the write operation. If the write is to flash memory 27, the procedure is analogous, except that flash-memory controller 33 controls the ultimate transfer via control paths 37F and 25C.

For read requests, operation is similar. However, if buffer 35 is empty, as indicated along control paths 35R and 5F, the selected controller 31, 33 does not enable buffer 35, but does enable interface 37. Thus, the read address and data are passed immediately to external memory bus 23. This saves a bus cycle during the read. On the other hand, if there is a request pending in buffer, the respective controller causes the read request to be stored in buffer 35. Obviously, content data is not transferred along with the address and control data. Once the request reaches external memory, the requested content data is returned via external memory bus 23, memory interface 37 (bypassing buffer 35), system bus 19, cache 13, processor bus 12, and processor 11.

An important advantage of the invention is that system bus 19 is occupied for only one bus cycle per isolated write to external memory instead of the entire duration of the access. Thus, for example, a data transfer involving local memory 15 can be executed during an external memory write. The gains in bus availability increase in the event of a series of writes, as indicated in FIG. 3. The top row of boxes indicates the degree to which bus cycles are occupied by five writes 1–5. The bottom row indicates the durations of the corresponding memory cycles M1–M5. The latter correspond collectively to the system-bus utilization that would occur without the system-bus buffer.

FIG. 3 indicates the savings where a memory write occupies four bus cycles. In that case, the system bus is occupied for only five of twenty cycles consumed by the memory accesses. The series of writes is completed seven bus cycles before the writes are completed. Thus, the system bus is free much sooner than it would be without the system buffer. In addition, there are system-bus cycles available before the series is completed; these can be used for non-external memory operations, such as accesses of internal memory, such as local memory 15. Where external-memory accesses consume more than four system-bus cycles, the savings are even more substantial.

Alternative embodiments can provide even greater savings. For example, if there are dedicated external memory buses (in place of shared external memory bus 21), one external data-transfer operation directed on one external memory can begin before a prior write operation to a different external memory is completed. In multi-processor systems, there are more situations in which a processor will not need to wait for the result of prior read operation to issue a request. Thus, greater use may be made of the system-bus cycles freed by the present invention. The present invention allows for system buffers that are used only for write requests or for both read and write requests. The present invention provides for system-bus buffers of different depths. These and other modifications to and variations upon the illustrated embodiments are provided for by the present invention, the scope of which is defined by the following claims.

What is claimed is:

1. A computer system, comprising:

a processor;

a first buffer coupled to the processor by a first bus;

a second buffer coupled to the first buffer by a second bus;

a local memory coupled to the second bus;

a first memory controller coupled to the processor by the second bus, further coupled to the second buffer, and further coupled to a memory interface; and a second memory controller coupled to the processor by the second bus, further coupled to the second buffer, and further coupled to the memory interface;

wherein the second buffer for storing data-transfer requests, the second buffer is coupled to the memory interface, and the memory interface is adapted to transmit data to, and receive data from a third bus;

a first memory and a second memory, each coupled to the third bus, wherein the first memory is connected to the first memory controller, and the second memory is connected to the second memory controller; and a read bypass path, the read bypass path connected to the memory interface, and adapted to transfer data from the memory interface to the second bus without having the data pass through the second buffer.

2. The computer system of claim 1, wherein the first memory is a RAM, and the first memory controller is adapted to provide control signals to the RAM.

3. The computer system of claim 2, wherein the first memory controller is adapted to generate one or more signals to prevent the second memory controller from accessing the third bus.

4. The computer system of claim 3, wherein the second memory controller is adapted to generate one or more signals to prevent the first memory controller from accessing the third bus.

5. The computer system of claim 4, wherein the first and second memory controllers are further adapted to generate signals that prevent access to a system bus by either the processor or the local memory until a transfer between the second bus and the second buffer is complete.

6. The computer system of claim 1, wherein the second memory is a flash memory, and the second memory controller is adapted to provide control signals to the flash memory.

7. A method of operating a computer system, comprising:

generating a plurality of write-requests from a processor;

responsive to the write-requests, transferring data and control information corresponding to those write-requests over a system bus to a system bus buffer;

generating a signal indicating that the system bus buffer is full;

generating a read-request from the processor;

responsive to the read-request, bypassing the system bus buffer and transferring data from an external memory bus to the system bus.

8. The method of claim 7, further comprising:

generating control signals to operate a first memory and transferring data from the system bus buffer to the first memory via an external memory bus.

9. The method of claim 8, further comprising:

generating control signals to operate a second memory and transferring data from the system bus buffer to the second memory via the external memory bus.

10. The method of claim 9, wherein the first memory is a RAM and the second memory is a flash memory.

11. The method of claim 9, further comprising transferring data between the processor and a local memory over the system bus concurrently with data being transferred between the system bus buffer and one of the first or second memories over the external memory bus.

* * * * *